(12) United States Patent
Gonzalez et al.

(10) Patent No.: US 11,932,994 B2
(45) Date of Patent: Mar. 19, 2024

(54) TISSUE PAPER WITH REDUCED FIBER AND METHODS OF MANUFACTURE

(71) Applicant: North Carolina State University, Raleigh, NC (US)

(72) Inventors: Ronalds W. Gonzalez, Raleigh, NC (US); Franklin J. Zambrano, Raleigh, NC (US); Hasan Jameel, Raleigh, NC (US); Richard A. Venditti, Raleigh, NC (US); Lokendra Pal, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 77 days.

(21) Appl. No.: 17/297,249

(22) PCT Filed: Nov. 27, 2019

(86) PCT No.: PCT/US2019/063540
§ 371 (c)(1),
(2) Date: May 26, 2021

(87) PCT Pub. No.: WO2020/112955
PCT Pub. Date: Jun. 4, 2020

(65) Prior Publication Data
US 2022/0064865 A1    Mar. 3, 2022

Related U.S. Application Data

(60) Provisional application No. 62/772,838, filed on Nov. 29, 2018.

(51) Int. Cl.
*D21H 27/00*    (2006.01)
*D21H 11/18*    (2006.01)
(Continued)

(52) U.S. Cl.
CPC .......... *D21H 27/005* (2013.01); *D21H 11/18* (2013.01); *D21H 21/10* (2013.01); *B82Y 40/00* (2013.01)

(58) Field of Classification Search
CPC ...... D21H 27/005; D21H 11/18; D21H 21/10; D21H 27/002; B82Y 40/00
See application file for complete search history.

(56) References Cited

U.S. PATENT DOCUMENTS 10,196,780 B2 *  2/2019  Lee ..................... D21H 11/08
11,198,973 B2 *  12/2021 Backfolk ............ D21H 17/29
(Continued)

FOREIGN PATENT DOCUMENTS

WO    2018193314 A1    10/2018
WO    WO-2018193314 A1 * 10/2018 ............. D21C 9/004

OTHER PUBLICATIONS

International Search Report and Written Opinion for PCT/US2019/063540 dated Jan. 31, 2020.
(Continued)

*Primary Examiner* — Jose A Fortuna
(74) *Attorney, Agent, or Firm* — Thomas | Horstemeyer, LLP

(57) ABSTRACT

Tissue paper of the disclosure exhibits advantageous softness and bulk at a basis weight less than that of basis weights found in currently available commercial tissue products, while delivering adequate strength for machine runability and consumer usage. This tissue is a lightweight paper that comprises a fiber core with up to 60% mechanically fibrillated fibers and a retention or drainage aid such as a cationic polyacrylamide polymer that facilitates drainage, softness, and bulk. This approach can reduce the fiber content of tissue products significantly while delivering the desired strength and other critical properties.

7 Claims, 10 Drawing Sheets

(51) Int. Cl.
*D21H 21/10* (2006.01)
*B82Y 40/00* (2011.01)

(56) References Cited

U.S. PATENT DOCUMENTS

| | | | |
|---|---|---|---|
| 11,598,050 B2* | 3/2023 | Backfolk | D21H 23/50 |
| 2013/0029106 A1* | 1/2013 | Lee | D21H 27/40 |
| | | | 162/146 |
| 2016/0186380 A1* | 6/2016 | Miller | D21H 11/04 |
| | | | 162/111 |
| 2017/0314207 A1 | 11/2017 | Sealey, II et al. | |
| 2018/0044859 A1 | 2/2018 | Hermans et al. | |
| 2022/0064865 A1* | 3/2022 | Gonzalez | D21H 27/005 |

OTHER PUBLICATIONS

Pejman Charani et al., "Utilization of Cellulose Nanofibers and Cationic Polymers to Improve Breaking Length of Paper", Cellulose Chem. Technol., 53 (7-8), 767-774(2019).

Isko Kajanto et al. "The Potential Use of Micro- and Nano-Fibrillated Cellulose as a Reinforcing Element in Paper", Journal of Science & Technology for Forest Products and Processes: vol. 2, No. 6, 42-48, (2012).

* cited by examiner

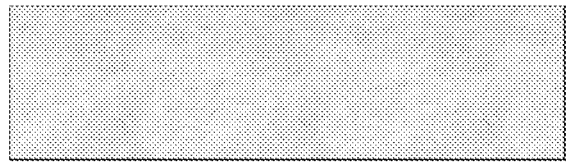

Control: Standard basis weight
+ refined or unrefined fibers (current practice)
Target strength softness, bulk, freeness

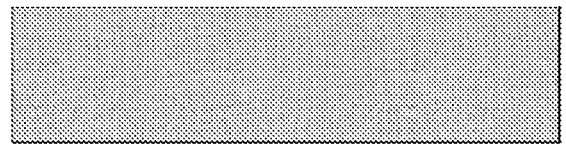

Embodiment 1: Standard basis weight
+ intensive mechanical fibrillation of portion of
cellulosic fiber mixture
Higher strength
Lower softness, bulk, freeness

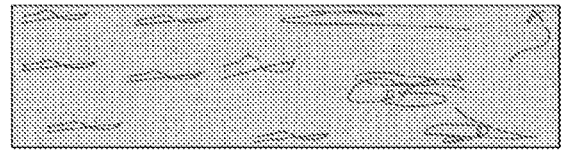

Embodiment 2: Standard basis weight
+ intensive mechanical fibrillation of portion of
cellulosic fiber mixture + drainage aid
Higher strength
Moderate softness, bulk
Target freeness

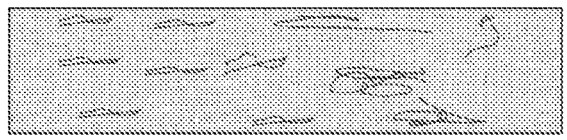

Embodiment 3: Reduced basis weight
+ intensive mechanical fibrillation of portion of
cellulosic fiber mixture + drainage aid
Target strength
Target or improved softness, bulk
Target freeness
Lower fiber use; lower water load

*Fig. 1*

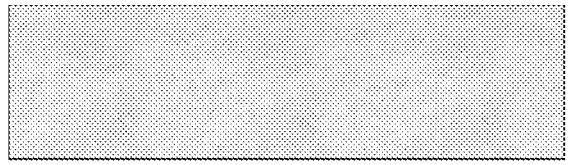

Control: Standard basis weight
+ refined or unrefined fibers (current practice)
Target strength softness, bulk, freeness

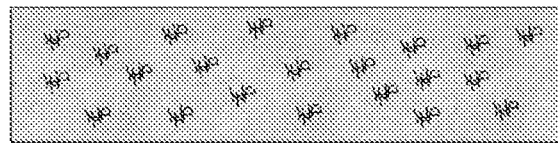

Embodiment 1: Standard basis weight
+ micro- and nanofibrillated cellulose (MNFC)
Higher strength
Lower softness, bulk, freeness

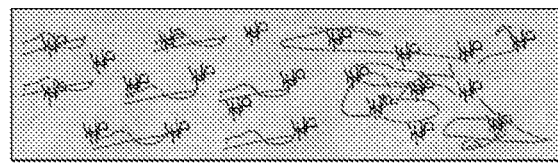

Embodiment 2: Standard basis weight
+ micro- and nanofibrillated cellulose (MNFC)
+ drainage aid
Higher strength
Moderate softness, bulk
Target freeness

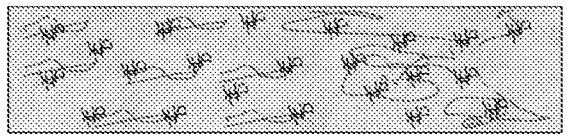

Embodiment 3: Reduced basis weight
+ micro- and nanofibrillated cellulose (MNFC)
+ drainage aid
Target strength
Target or improved softness, bulk
Target freeness
Lower fiber use; lower water load

*Fig. 2*

TISSUE PAPER WITH REDUCED FIBER AND METHODS OF MANUFACTURE

CROSS-REFERENCE TO RELATED APPLICATION

This application is the 35 U.S.C. § 371 national stage application of PCT Application No. PCT/US2019/063540, entitled "TISSUE PAPER WITH REDUCED FIBER AND METHODS OF MANUFACTURE", filed Nov. 27, 2019, where the PCT claims priority to U.S. Provisional Application No. 62/772,838, entitled "REDUCED FIBER TISSUE PAPER AND METHODS OF MANUFACTURE" filed on Nov. 29, 2018, the entireties of which are herein incorporated by reference.

TECHNICAL FIELD

The present disclosure is generally related to methods of making tissue paper with reduced fiber content. The present disclosure is also generally related to tissue paper with reduced fiber content.

BACKGROUND

In the hygiene tissue industry, strength properties are necessary to meet the stresses and strains caused during manufacturing, converting and usage. While tissue paper produced from traditional manufacturing techniques can perform well in terms of achieving higher strength, such paper is subject to problems with respect to lower softness, lower bulk, lower drainage, lower machine speed, higher basis weight (increase in fiber usage), longer drying, and other related issues.

Cross-sectional market analysis conducted on tissue products across the United States show that consumers are willing to pay a premium for tissue with extra softness, bulk, and water absorbency, but not for products with a superior strength (Wang et al. (2019) *Bioresources* 14: 9410-9428). Manufacturing operations to achieve the nominal tensile strength, e.g., mechanical refining, wet-end chemistry, or increase of basis weight, tend to exceed product specifications to deliver a much stronger paper, but with negative impacts on tissue softness and bulk that hurt tissue paper quality, productivity, and cost.

SUMMARY

One aspect of the disclosure encompasses embodiments of a cellulose fiber slurry for use in the manufacture of a tissue paper, the cellulose fiber slurry comprising cellulose fibers that have been subjected to (i) mechanical or chemical fibrillation of between about 1% to about 60% fiber dry weight of the cellulose fiber to a freeness level between about 50 mL Canadian Standard Freeness (CSF) and about 390 mL CSF or (ii) conversion to micro- and nanofibrillated cellulose of about 0.10% to about 30% fiber dry weight of the cellulose fibers; and a retention or drainage aid, wherein the cellulose fiber slurry can have a freeness level greater than about 250 mL CSF.

In some embodiments of this aspect of the disclosure, the cellulose fibers can comprise hardwood chemical pulp or a combination of hardwood and softwood chemical pulps.

In some embodiments the cellulose fiber slurry can comprise recycled cellulose fibers, mechanical cellulose fibers, non-wood cellulose fibers, or any combination thereof.

In some embodiments of this aspect of the disclosure, the cellulose fibers can comprise hardwood chemical pulp or a combination of hardwood and softwood chemical pulps and can further comprise recycled cellulose fibers, mechanical cellulose fibers, non-wood cellulose fibers, or any combination thereof.

In some embodiments of this aspect of the disclosure, the micro- and nanofibrillated cellulose can comprise at least one of microfibrillated cellulose, nanofibrillated cellulose, fibrillary fines, and fiber fragments.

In some embodiments of this aspect of the disclosure, the amount of the retention or drainage aid can be between about 0.005% to about 4% of the dry weight of the cellulose fibers.

In some embodiments of this aspect of the disclosure, the retention or drainage aid can be selected from the group consisting of a cationic or anionic acrylamide copolymer, a PEI copolymer, polyethylene oxide (PEO), and a cationic polymer combined with an anionic microparticle In some embodiments of this aspect of the disclosure, the anionic microparticle can be colloidal silica, bentonite, a micropolymer, or any combination thereof.

Another aspect of the disclosure encompasses embodiments of a method to manufacture a tissue paper, the method comprising the steps of: (a) obtaining a cellulose fiber slurry by combining a non-fibrillated or partially fibrillated cellulose fiber slurry with a fibrillated cellulose fiber slurry having a freeness level between about 50 mL CSF to about 390 mL CSF or a micro- and nanofibrillated cellulose; (b) adding a retention or drainage aid to the cellulose fiber slurry, thereby generating a cellulose fiber slurry having a freeness greater than about 250 mL CSF; and (c) manufacturing a tissue paper with a basis weight of from about 7 to about 80 grams per square meter.

In some embodiments of this aspect of the disclosure, in step (a) between about 40% to about 99.9% fiber dry weight of the cellulose fiber of the cellulose fiber slurry can be non-fibrillated or fibrillated to have a freeness level of at least 300 mL CSF.

In some embodiments of this aspect of the disclosure, in step (a) between about 1% to about 60% fiber dry weight of the cellulose fiber of the cellulose fiber slurry can be subjected to mechanical or chemical fibrillation to a freeness level between about 50 mL Canadian Standard Freeness (CSF) and about 390 mL CSF.

In some embodiments of this aspect of the disclosure, in step (a) between about 0.10% to about 30% fiber dry weight of the cellulose fiber of the cellulose fiber slurry can be converted to micro- and nanofibrillated cellulose.

In some embodiments of this aspect of the disclosure, the micro- and nanofibrillated cellulose comprises at least one of microfibrillated cellulose, nanofibrillated cellulose, fibrillary fines, and fiber fragments.

In some embodiments of this aspect of the disclosure, after the addition of the retention or drainage aid the cellulose fiber slurry can have a freeness level greater than about 250 mL CSF.

In some embodiments of this aspect of the disclosure, the cellulose fibers can comprise hardwood chemical pulp or a combination of hardwood and softwood chemical pulps.

In some embodiments the cellulose fiber slurry can comprise recycled cellulose fibers, mechanical cellulose fibers, non-wood cellulose fibers, or any combination thereof.

In some embodiments of this aspect of the disclosure, the cellulose fibers can comprise hardwood chemical pulp or a combination of hardwood and softwood chemical pulps and can further comprise recycled cellulose fibers, mechanical cellulose fibers, non-wood cellulose fibers, or any combination thereof.

In some embodiments of this aspect of the disclosure, the amount of the retention or drainage aid can be between about 0.005% to about 4% of the dry weight of the cellulose fibers of the tissue-making cellulose fiber slurry.

In some embodiments of this aspect of the disclosure, the retention or drainage aid can be selected from the group consisting of a cationic or anionic acrylamide copolymer, a PEI copolymer, polyethylene oxide (PEO), and a cationic polymer combined with an anionic microparticle.

In some embodiments of this aspect of the disclosure, the tissue paper manufactured in step (c) can have a basis weight of from about 7 to about 54.6 g/m$^2$; a caliper from about 126 μm to about 794 μm, wherein the caliper is measured by applying a static load of 2 kPa; a bulk from about 6.1 cm$^3$/g to about 17.2 cm$^3$/g; TSA Softness (TS7) from about 7.5 dB to about 20.3 dB; TSA Smoothness (TS750) from about 12.9 dB to about 75.3 dB; tensile strength (MD) from about 100 N/m to about 668 N/m; tensile strength (CD) from about 28 N/m to about 220 N/m; arithmetic average tensile strength from about 78 N/m to about 424 N/m.

Yet another aspect of the disclosure encompasses embodiments of a tissue paper manufactured by any method herein disclosed.

In some embodiments of this aspect of the disclosure, wherein the tissue paper can have a basis weight of from about 7 to about 54.6 g/m$^2$; a caliper from about 126 μm to about 794 μm, wherein the caliper is measured by applying a static load of 2 kPa; a bulk from about 6.1 cm$^3$/g to about 17.2 cm$^3$/g; TSA Softness (TS7) from about 7.5 dB to about 20.3 dB; TSA Smoothness (TS750) from about 12.9 dB to about 75.3 dB; tensile strength (MD) from about 100 N/m to about 668 N/m; tensile strength (CD) from about 28 N/m to about 220 N/m; arithmetic average tensile strength from about 78 N/m to about 424 N/m.

BRIEF DESCRIPTION OF THE DRAWINGS

Further aspects of the present disclosure will be more readily appreciated upon review of the detailed description of its various embodiments, described below when taken in conjunction with the accompanying drawings.

FIG. 1 illustrates a control tissue paper and embodiments of tissue paper according to the disclosure, the manufacture of which combines intensive fibrillation of a portion of the cellulosic fiber mixture and addition of a retention or drainage aid to the tissue-making slurry.

FIG. 2 illustrates a control tissue paper and embodiments of tissue paper according to the disclosure, the manufacture of which combines partial to no fibrillation of the cellulosic fiber mixture, and addition of micro- and nanofibrillated cellulose (MNFC) and a retention or drainage aid to the tissue-making slurry.

FIG. 5A illustrates the results when the tissue manufacturing pathway consisted of intensive mechanical fibrillation of a portion of the cellulosic fiber mixture and addition of a cationic polyacrylamide (CPAM) to a fiber slurry. The horizontal dash-dotted line indicates the tensile strength of the control tissue paper. In the example shown, mechanical fibrillation of a portion of the cellulosic fiber mixture to levels below 400 mL Canadian Standard Freeness (CSF), followed by the addition of a CPAM to the tissue-making slurry, allowed a reduction of about 12.1% fiber content of the tissue paper, while delivering a tensile strength of about 676 N/m, similar to that of the control tissue paper.

FIG. 5B illustrates the results when the tissue manufacturing pathway consisted of no mechanical fibrillation of the cellulosic fiber mixture but with the addition of MNFC and a CPAM to the slurry. The dash-dotted line indicates the tensile strength of the control tissue paper. In the example shown, the addition of 2% MNFC and a CPAM to the fiber slurry with no mechanical fibrillation of the cellulosic fiber mixture allowed a reduction of at least 14.1% fiber content in the tissue paper, while meeting the tensile strength of the control tissue paper (360 N/m).

A lower TS7 value is generally associated with a softer tissue sheet. The horizontal dash-dotted line in FIGS. 6A and 6B indicate the TSA softness of a control tissue paper.

Figure 6A:
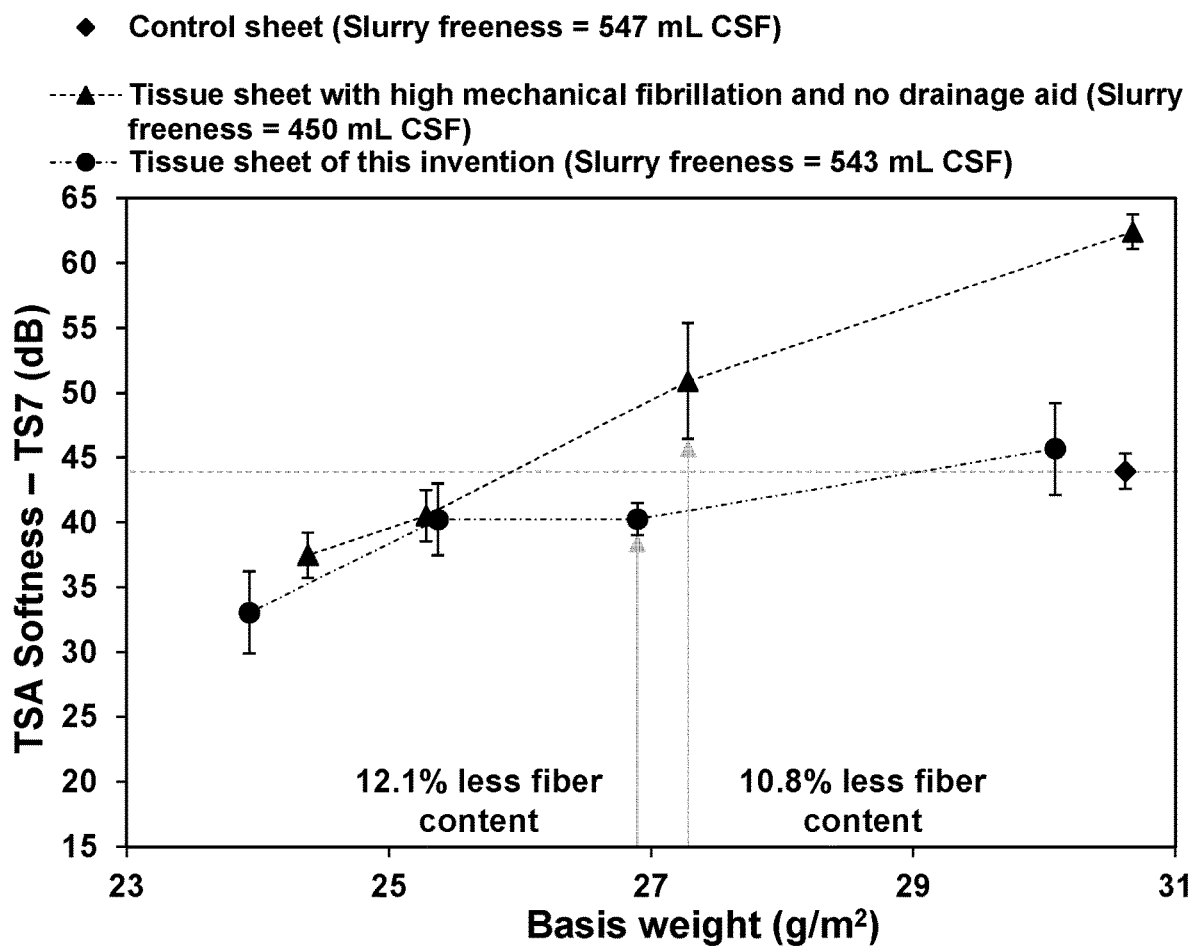
FIGS. 6A and 6B illustrate the effect on TSA (Tissue Softness Analyzer, EmTec Inc) softness of tissue paper generated using the methods of the disclosure.

When no CPAM was added in the tissue-making slurry, the fiber reduction allowed partial recovery of softness losses caused by either the intensive mechanical fibrillation or the addition of MNFC. Both manufacturing pathways resulted in tissue paper that had less softness compared to the control tissue paper (TS7 values above the value of the control tissue paper) at a basis weight where the tensile strength of the control paper is met. The combination of intensive mechanical fibrillation of a fraction of the cellulosic fiber mixture with the subsequent addition of CPAM mitigated the softness losses, resulting in a tissue paper with improved softness (a TS7 value 8.2% below the value of the control paper) but with 12.1% less fiber content. (FIG. 6A).

Figure 6B:
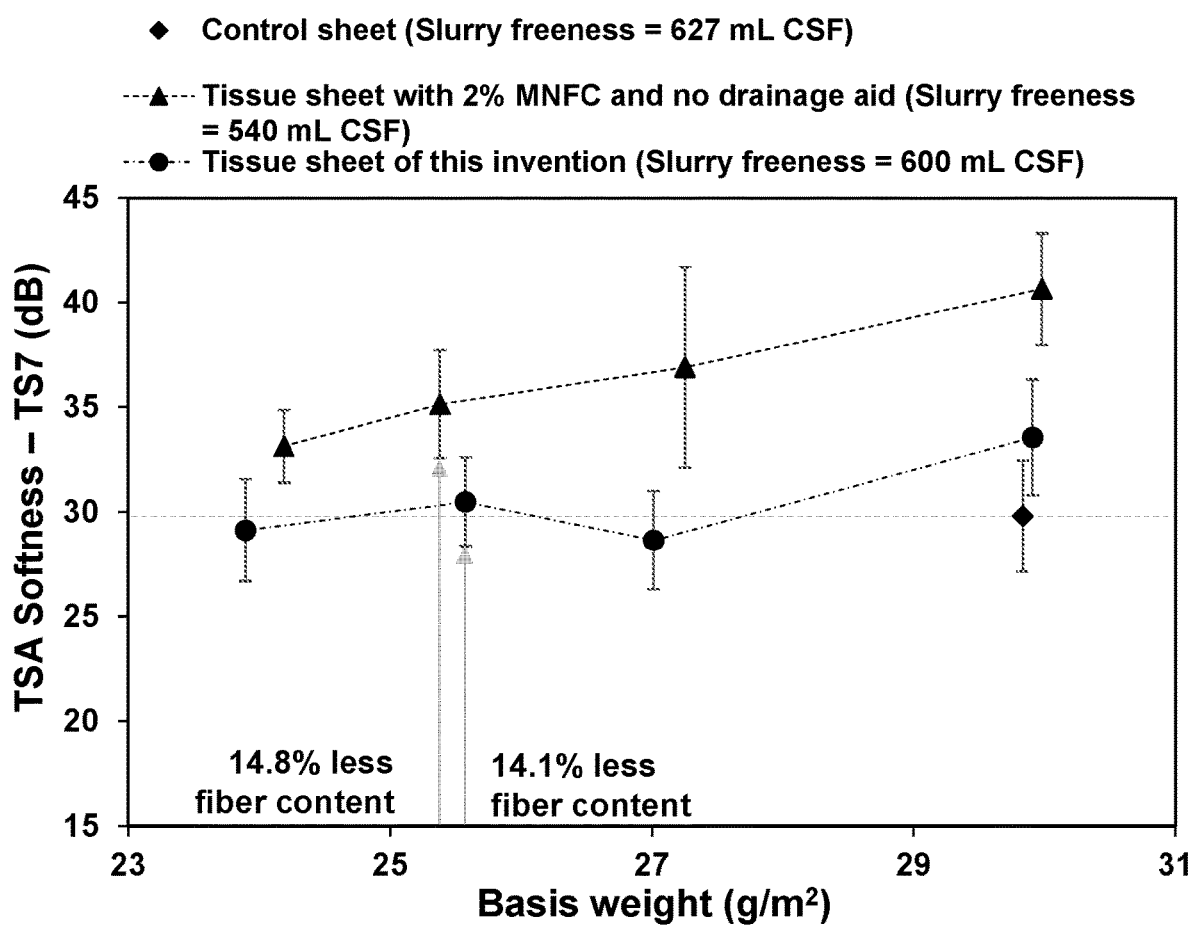

The combination of MNFC with a CPAM mitigated the softness losses and allowed obtaining a tissue paper with similar softness and strength as that of the control sheet (TS7 value 1.6% above the value of the control paper) but with 14.1% less fiber content. (FIG. 6B).

Figure 7A:
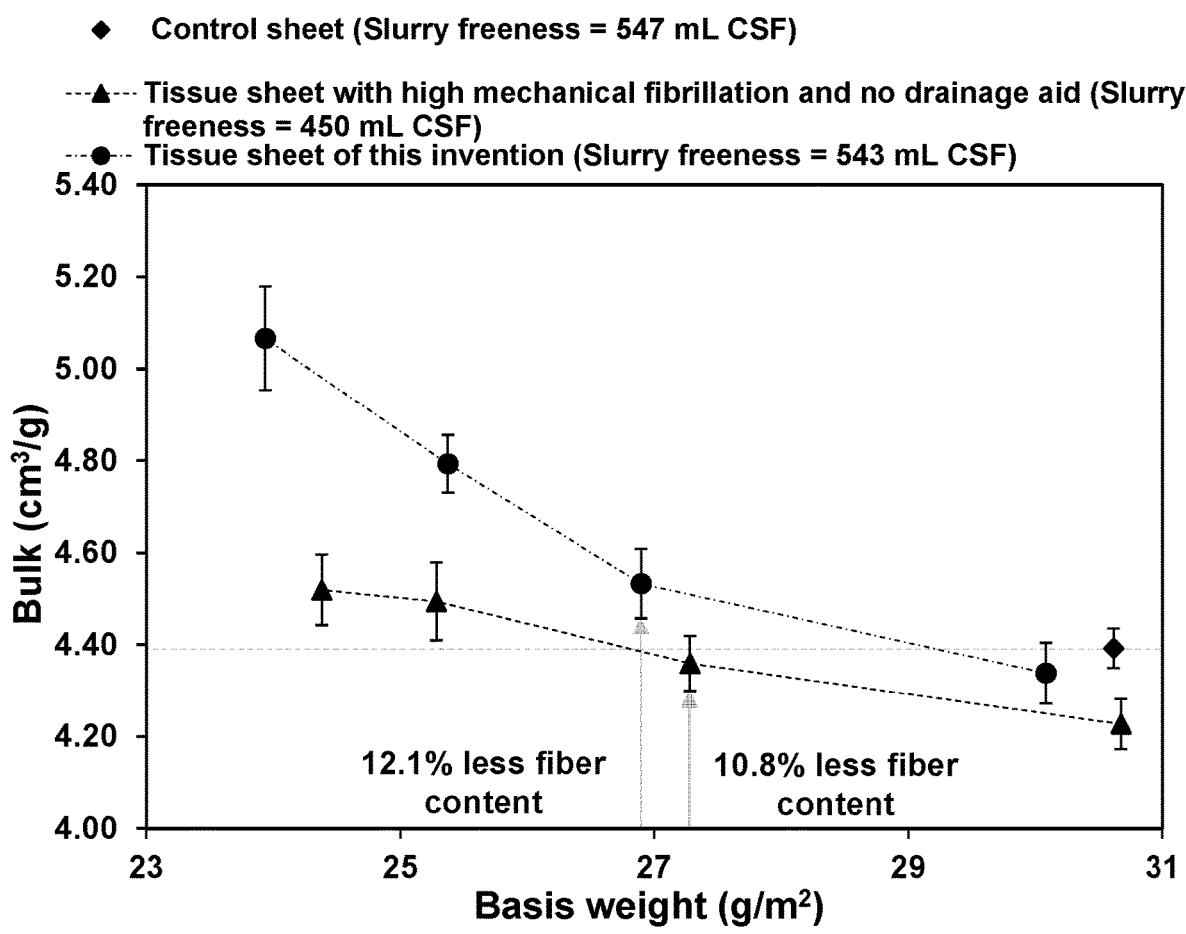
Figure 7B:
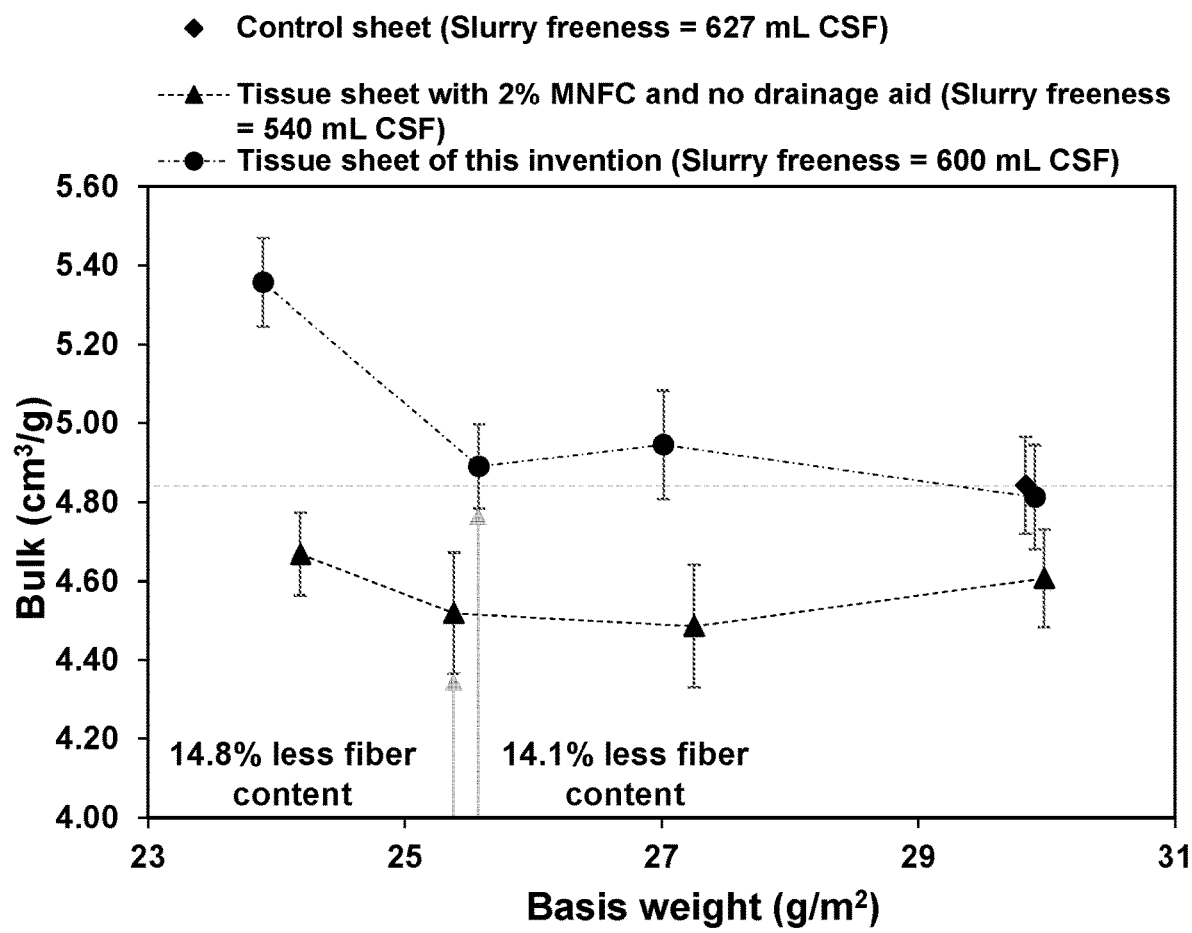

FIGS. 7A and 7B illustrate the effect on the bulk of tissue paper generated using the methods of the disclosure. The horizontal dash-dotted line in FIGS. 7A and 7B indicates the bulk of the control tissue paper.

Both manufacturing pathways, i.e. intensive mechanical fibrillation of a fraction of the cellulosic fiber mixture and addition of MNFC, caused initially a drop in the bulk of the tissue paper. Addition of a CPAM accompanied by the reduction in fiber content resulted in a tissue paper with 12.1% less (FIG. 7A) and 14.1% less (FIG. 7B) fiber content, respectively, while retaining the strength of the control tissue paper and with a bulk that was 3.2% (FIG. 7A) and 1.0% higher (FIG. 7B) than a control.

DETAILED DESCRIPTION

This disclosure is not limited to particular embodiments described, and as such may, of course, vary. The terminology used herein serves the purpose of describing particular embodiments only and is not intended to be limiting since the scope of the present disclosure will be limited only by the appended claims.

Where a range of values is provided, each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Embodiments of the present disclosure will employ unless otherwise indicated, techniques of medicine, organic chemistry, biochemistry, molecular biology, pharmacology, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, dimensions, frequency ranges, applications, or the like, as such can vary. It is also to be understood that the terminology used herein is for purposes of describing particular embodiments only, and is not intended to be limiting. It is also possible in the present disclosure that steps can be executed in different sequence, where this is logically possible. It is also possible that the embodiments of the present disclosure can be applied to additional embodiments involving measurements beyond the examples described herein, which are not intended to be limiting. It is furthermore possible that the embodiments of the present disclosure can be combined or integrated with other measurement techniques beyond the examples described herein, which are not intended to be limiting.

It should be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Each of the applications and patents cited in this text, as well as each document or reference cited in each of the applications and patents (including during the prosecution of each issued patent; "application cited documents"), and each of the PCT and foreign applications or patents corresponding to and/or claiming priority from any of these applications and patents, and each of the documents cited or referenced in each of the application cited documents, are hereby expressly incorporated herein by reference. Further, documents or references cited in this text, in a Reference List before the claims, or in the text itself; and each of these documents or references ("herein cited references"), as well as each document or reference cited in each of the herein cited references (including any manufacturer's specifications, instructions, etc.) are hereby expressly incorporated herein by reference.

Prior to describing the various embodiments, the following definitions are provided and should be used unless otherwise indicated.

Abbreviations

SBHK, Southern Bleached Hardwood Kraft; NBSK, Northern Bleached Softwood Kraft; CPAM, cationic polyacrylamide; CSF, Canadian Standard Freeness; MNFC, micro- and nanofibrillated cellulose Definitions The term "freeness" as used herein refers to a measure of how quickly water is able to drain from a fiber furnish sample. In many cases there is a correlation between freeness values and either (a) a target level of refining of pulp, or (b) the ease of drainage of white water from the wet web, especially in the early sections of a Fourdrinier former. Standard tests of freeness are based on gravity dewatering through a screen. The devices are designed so that an operator can judge the speed of dewatering by observing the volume of liquid collected in a graduated cylinder. Freeness tends to be decreased by refining and by increases in the level of fines in the furnish. Freeness can be increased by use of retention or drainage aids, removal of fines, or enzymatic treatments to convert mucilaginous materials into sugars.

The "Canadian Standard" freeness (CSF) test is designed to provide a measure of the rate at which a dilute suspension of pulp is dewatered under specified conditions. It has been shown that the drainability is related to the surface conditions and swelling of the fibers, and constitutes a useful index of the amount of mechanical treatment to which the pulp has been subjected. Results of this test do not necessarily correlate with the drainage behavior of a pulp on a commercial paper machine. A method for the determination of drainability in terms of the Schopper-Riegler number is specified in ISO 5267-1.

The term "fibrillation" as used herein refers to both a process and the result of that process. Refining can be defined as the passage of a slurry of papermaking fibers between plates in relative motion to each other that have raised bars on their surfaces. The fibers are subjected to shearing and compression forces. One of the things that happens during refining of fibers is fibrillation, the partial delamination of the cell wall, resulting in a microscopically hairy appearance of the wetted fiber surfaces. The "hairs" are also called fibrillation. The smallest microfibrils may be as small as individual cellulose chains. Fibrillation tends to increase the relative bonded area between fibers after the paper has been dried.

The term "nanocellulose" as used herein refers to microfibrillated/microfibrillar cellulose and nanofibrillated/nanofibrillar cellulose of the types as described, for example, in U.S. Pat. Nos. 4,483,743; 4,952,278, WO 2007/091942, Wagberg Lars et al., (2008) *Langmuir* 24: 784-795, and Saito et al., (2007) *Biomacromolecules* 8: 2485-2491. The basic idea underlying the development of nanocellulose is to simply delaminate the cell wall and liberate the microfibrils, which constitute the major building block of wood fibers. The nanocelluloses are gel type of materials even at very low concentrations. The width and length of the nanocellulose fibers vary depending on the specific manufacturing process and the feedstock used for their production. A typical width of nanocellulose is from about 3 to about 100 nm, preferably from about 10 to about 30 nm, and a typical length is from about 100 nm to about 2 μm, preferably from about 100 to 1000 nm.

The nanocellulose can be produced from cellulosic pulp or prehydrolyzed cellulosic pulp including sulfite pulp and kraft pulp by multiple shearing as described, for example, in U.S. Pat. No. 4,483,743, or by enzymatic hydrolysis combined with mechanical shearing as described in WO 2007/091942, or by chemically pretreating/modifying the cellulosic pulp and then subjecting the same to mechanical shearing as described by Wagberg Lars et al., (2008) *Langmuir* 24: 784-795, and Saito et al., (2007) *Biomacromolecules* 8: 2485-2491.

A preferred nanocellulose is of the type produced from cellulose pulp by enzymatic treatment followed by homogenization in a high-pressure homogenizer. The enzyme in the enzymatic treatment preferably comprises a cellulase, such as endoglucanase. The high-pressure homogenizer preferably comprises z-shaped chambers and the pulp is passed several times, preferably at least three times through the chambers.

Another preferred nanocellulose is of the type produced from cellulose pulp by chemical pre-treatment followed by homogenization in a high-pressure fluidizer/homogenizer. Various chemical modifications are known in the art. A preferred chemical pre-treatment comprises carboxymethylation of the cellulose fibers. The pulp may be sulfite pulp or kraft pulp. Also dissolving pulps, such as sulfite dissolving pulp, having a low content of hemicellulose may be used. The high-pressure homogenizer preferably comprises z-shaped chambers and the pulp is passes at least once through the chambers.

The micro and nanocellulose fibers may be added to the tissue-making cellulose fiber slurry in the form of an aqueous suspension or gel comprising about 5%, preferably 0.1 to 4%, more preferably from 0.3 to 3% by weight solids.

The term "retention aid or drainage aid" as used herein can refer to a cationic or anionic acrylamide copolymer having molecular mass values in the range of 5 to 20 million grams per mole. These are known to be effective for improving the retention of fine particles during formation of paper. The retention or drainage aid maintains adequate efficiency, drainage, and cleanliness of a paper machine; to achieve adequate Z-directional uniformity; to retain additives, including fillers.

Retention or drainage aids can have a profound effect on the efficiency of the process and on the quality of the product. The most general rule is to add only the amount of retention or drainage aid that is needed to optimize runnability and avoid excessive problems of two-sidedness of the sheet structure. Typical chemicals used as retention or drainage aids include, but are not limited to, such as polyacrylamide (PAM), cationic polyacrylamide (CPAM), polyethyleneimine (PEI), colloidal silica, and bentonite.

The cationic polymer used in the methods of the disclosure can be produced advantageously by copolymerizing acrylamide with a cationic monomer or methacrylamide with a cationic monomer. The molecular weight of the cationic polymer is preferably at least 500,000, and it is added to the stock preferably in an amount of at minimum 0.005%, especially preferably 0.01-0.06% as active substance based on dry solids weight of the stock.

The cationic polymer used in the methods of the disclosure may be any copolymer of acrylamide and/or methacrylamide, prepared using at least one of the co-monomers a cationically charged or cationically chargeable monomer.

Such monomers include, but are not limited to, methacryloyloxyethyltrimethyl ammonium chloride, acryloyloxyethyltrimethyl ammonium chloride, 3-(methacrylamido)propyltrimethyl ammonium chloride, 3-(acryloylamido) propyltrimethyl ammonium chloride, diallyldimethyl ammonium chloride, dimethylaminoethyl acrylate, dimethylaminoethyl methacrylate, dimethylaminopropylacrylamide, dimethylaminopropylmethacrylamide, or a similar monomer. The polymer may also contain monomers other than acrylamide, methacrylamide, or some cationic or cationizable monomer.

The term "acrylamide" as used herein refers to papermaking additives having a wide range of molecular mass, degree of branching (often linear copolymers), and relative proportion of charged monomeric groups. One of the monomers is plain acrylamide, $CH=C[-CONH_2]-$ in which the group in brackets is attached to the second carbon. For production of an anionic copolymer, the co-monomer is often acrylic acid, $-CH=C[-COOH]-$. Cationic co-monomers typically have quaternary ammonium groups, and they are attached to the nitrogen of the amide, $-CH=C[-CONH-RN+(CH_3)_3]-$, where R can take a variety of forms. Polymerization is achieved by "zipping" the double bonds together so that the polymer backbone consists of single bonds (unsaturated).

The term "softwood fibers (tracheids)" as used herein refers to wood fibers obtained from needle-bearing conifer trees. The main chemical components of softwood kraft tracheids, namely cellulose and hemicellulose, are polymers of glucose, with each unit connected by a β-1-4-glycosidic linkage. These molecules are arranged in a series of layers having different angles relative to the fiber direction. The thickest of these layers (the S2 sublayer) has a fibril angle almost lined up with the fiber, and this accounts for the high dimensional stability of both fibers and wood in the length direction. The cellulose polymers are partly fused together in microscopic crystalline domains, and this accounts for the insolubility of the wood fibers. Two main pulping methods, Kraft and mechanical, are used to liberate the fibers. The Kraft process dissolves a natural phenolic resin called lignin from between the fibers. In mechanical pulping, the lignin is left in place. For example, in thermomechanical pulping (TMP), wood chips are passed between rotating plates having raised bars at elevated temperature and pressure. The heating softens the lignin and makes it possible to separate the fibers in an intact state, obtaining a yield of over 90% of the original solids from the wood. Softwood fibers from commonly used papermaking species such as pine, spruce, alpine fir, and Douglas fir have tracheid fibers approximately 3 mm long and 20 to 30 μm thick. Especially after Kraft pulping the refining process tends to delaminate the cell wall, allowing the fiber to collapse into a ribbon, greatly increasing the fibers' ability to bond to each other.

Softwood fibers (tracheids) confer high tearing strength, ability to withstand multiple folding, and a range of other strength-related properties.

Softwood chemithermomechanical pulp (CTMP) is useful in products that can benefit from decreased density. One of the key considerations in the use of softwood pulps is how to achieve a satisfactory formation uniformity. The ratio of length to width (aspect ratio) of softwood fibers is often as high as 100. That means that the fibers have a strong tendency to clump together when suspended in water. In theory, one would have to reduce the solids level to less than about 0.01% to give every fiber room to rotate without colliding into an adjacent fiber.

The term "hardwood fibers" as used herein refers to the major component of wood from a deciduous (hardwood) tree and consists of libriform fibers. These are about 1 mm in length and about 20 micrometers in width. Wood from deciduous trees is a complicated mixture of these fibers, multicellular vessels (for transport of water from the roots), and other specialized cells. The Kraft pulping method chemically dissolves the lignin, a natural phenolic resin that glues fibers together in wood. Kraft pulping yields fibers that tends to have superior bonding ability after they have been made flexible by the compression and shearing action of a refiner. Semi-chemical hardwood pulps are cooked under conditions that solubilize only a fraction of the lignin. Some mechanical refining is needed after the semi-chemical cook to liberate fibers from the softened chips. Two such processes are the carbonate cook and neutral-sulfite semi-chemical (NSSC). Because lignin is stiff, these pulps behave differently. Also, the high content of lignin and extractable materials such as fatty acids contribute to a higher density of anionic surface charge of semi chemical fibers, compared to most Kraft pulps.

Discussion

The tissue paper according to the disclosure exhibits advantageous softness and bulk at a basis weight less than that of basis weights found in currently available commercial tissue products, while delivering adequate strength for machine runability and consumer usage. This tissue is a lightweight paper that comprises a fiber core with up to 60% mechanically fibrillated fibers and a retention or drainage aid such as a cationic polyacrylamide polymer that facilitates drainage, softness, and bulk. This approach can reduce the fiber content of tissue products significantly (up to 30% compared to available commercial products) while delivering the desired strength and other critical properties.

The present disclosure, therefore, encompasses embodiments of methods of tissue paper manufacture that produce an excess of tissue strength and use some or all of such excess strength to provide a reduction of fiber content in the tissue paper. The present disclosure provides manufacturing pathways for the reduction in fiber content of tissue paper by at least 1% based on the dry fiber weight of the tissue paper. The manufacturing pathways can produce tissue paper with nominal strength values at a lower fiber content and without adverse effects on tissue softness and bulk, and freeness of the tissue-making slurry. In specific cases, the tissue paper has improved bulk and softness. The pathways are based on using "excess" strength (i.e., strength that can be reduced without detriment to the function or desired properties of the tissue paper) obtained by state of the art practices (e.g., mechanical refining and wet-end additives) to drive the reduction of fiber content. This allows for a reduction of between about 1% to about 30% of fiber use compared to the specifications of commercially available tissue products (while also delivering a product with a strength similar to that found in commercially available tissue products) and, in specific cases, with improved bulk and softness.

Embodiments of the manufacturing pathways of the disclosure can encompass intensive fibrillation of a fraction of a cellulosic fiber mixture and addition of a retention or drainage aid, for example, but not limited to a cationic polyacrylamide (CPAM) to a tissue-making slurry. The intensively fibrillated portion, which may comprise between about 1% to about 60% of the dry fiber weight of the tissue paper, can be refined to a freeness level atypical in current commercial tissue-making operations involving virgin fibers, i.e., between about 50 mL CSF to about 390 mL CSF. Such a fraction, which is the main source of mechanical strength in the tissue paper, typically corresponds to the softwood pulp (long fiber fraction). The remaining fraction of the cellulosic fiber mixture is partially fibrillated to freeness levels greater than 390 mL CSF, or not treated. The remaining fraction, which is the primary source of softness and bulk in the tissue paper, typically corresponds to the hardwood pulp (short fiber fraction). The treatment of the cellulosic fiber mixture is performed so that the strength of the sheet is achieved by refining the long fiber fraction, while the short fiber fraction is protected to preserve bulk and softness in the tissue paper.

Mechanical fibrillation to low freeness values is undesirable in tissue-making practices as it compromises machine speed, and thus reduces tissue mill productivity. Moreover, it produces paper webs with undesired high strength and limited softness, bulk, and absorbency, which are advantageous properties and drive high shelf prices. Traditional tissue-making operations avoid refining virgin fibers to freeness values below 420 mL CSF.

The present methods of the disclosure offset excessive strength developed in the tissue paper to allow for a reduction in the fiber content. The reduction in the fiber content retains the desired paper strength, offsetting some of the detrimental effects on tissue softness. The negative effects on drainage are compensated by the addition of a CPAM, which recovers the freeness of the slurry to levels that are suitable for high machine speeds while ensuring at the same time, the retention of extra fine particles that may be generated due to the intensive mechanical action on the cellulosic fibers. The amount of the CPAM is adjusted to maintain the freeness of the tissue-making slurry in a range between about 450 mL CSF to about 650 mL CSF depending on the cellulosic fiber mixture and the operational requirements of the machine. The incorporation of a CPAM in the sheet also helps mitigating any softness and bulk losses. This, added to the benefits on softness and bulk driven by the reduction of fiber, allows obtaining a tissue with a reduced fiber content compared to current commercially available tissue papers, which has similar or improved softness and bulk.

The ease to reduce the fiber content in the tissue sheet increases with the use of unrefined or high-quality paper-making fibers, as they develop sheet strength more efficiently compared to fibers that have been exposed to several stages of mechanical treatment or have been previously recycled. Low fines content in the slurry before and after the mechanical treatment is preferred as they impact the dosage of CPAM required to maintain the freeness of the slurry at levels permissible for machine operation. An increase in the fines content is typically associated with an increase in the polymer dosage and thus with an increase in the operating costs. Moreover, a deficient refining technology that results in large fines generation in the slurry rather than surface fibrillation, increase in fiber flexibility, and fiber delamination, will poorly develop the excess strength needed to reduce the fiber content of the sheet.

The amount of acceptable fiber reduction by application of the methods of the present disclosure at least in part depends on the characteristics of the control sheet against which one assesses the reduction in weight. Thus, paper-making fibers in a sheet where strength properties are developed will have already achieved or be close to their maximum strength potential. Accordingly, a more intense mechanical action is required to further develop the sheet strength to achieve the excess that offsets fiber reduction. It is also more difficult to reduce the fiber content as the weight of the control sheet decreases because fiber bonding is more hindered in the lighter sheet. This requires a greater degree of mechanical action to develop the gain in strength with fewer fibers available.

The manufacturing processes of the disclosure can further encompass the use of continued mechanical fibrillation of a portion of the cellulosic fiber mixture to generate MNFC that is then added to the tissue-making slurry in combination with a retention or drainage aid, most advantageously a CPAM. Cellulosic materials at the micro- and nanoscale are well-known for their paper strengthening capacity (Boufi et al. (2016) *Carbohydr. Polym.* 154: 151-166). The incorporation of MNFC in a fiber network increases the fiber-to-fiber bonding and thus the total bonded area in the paper sheet. Moreover, the self-tendency of MNFC to form nano-networks of outstanding intrinsic strength along larger fibers provides the macro structure with points of high resistance. These two factors contribute to an increase in the paper density and an overall improvement in the strength properties (González et al., (2012) *BioResources* 7: 5167-5180).

MNFC can be obtained from lignocellulosic feedstocks via an intensive mechanical fibrillation, which causes liberation of the fibrils through compression and cyclic and abrasive shear forces. The biomass can be pre-treated by chemical or mechanical means to reduce the energy required for fibrillation. Various environmentally friendly and renewable lignocellulosic feedstocks can be used for the production of MNFC, including softwood, hardwood, recycled fibers and/or nonwood fibers. The entropic character of the mechanical process makes the material obtained from this operation heterogeneous by nature. The cellulosic material may be composed of nanofibrils, microfibrils, fibrillary fines, fiber fragments, and/or fibrillated fibers. The relative proportion of each species may vary based on the energy input and the type of pre-treatment applied to the fibers.

The portion of cellulosic fiber that is subjected to this extensive mechanical treatment is advantageously between about 0.10% to about 30% of the dry fiber weight of the tissue paper. The percentage of cellulosic fiber mixture mechanically treated can be lowered compared to the 1% to about 60% of the method previously described, as a result of significant gains in tissue strength driven by the highly fibrillated cellulosic material. This allows lowering the amount of fibrillated material in the tissue-making slurry to produce the excess strength that is necessary to offset the fiber content reduction in the tissue paper.

Upon application of the manufacturing pathways of the disclosure, if the target for fiber reduction (strength gain) is achieved solely with the addition of MNFC, the remaining cellulosic fiber mixture is most advantageously not refined so as to preserve the bulk and softness inherent to the unrefined state of the fibers. On the other hand, if the addition of MNFC is not sufficient to attain the target fiber reduction, the remaining cellulosic fiber mixture, more specifically the long fiber fraction, can be subjected to partial mechanical fibrillation, e.g., to a freeness value greater than 500 mL CSF, to further develop the strength of the paper web. In all cases, the amount of CPAM added to the tissue-making slurry can be adjusted to maintain the slurry freeness at levels that meet tissue machine runnability.

One aspect of the disclosure encompasses embodiments of a cellulose fiber slurry for use in the manufacture of a tissue paper, the cellulose fiber slurry comprising cellulose fibers that have been subjected to (i) mechanical or chemical fibrillation of between about 1% to about 60% fiber dry weight of the cellulose fiber to a freeness level between about 50 mL Canadian Standard Freeness (CSF) and about 390 mL CSF or (ii) conversion to micro- and nanofibrillated cellulose of about 0.10% to about 30% fiber dry weight of the cellulose fibers; and a retention or drainage aid, wherein the cellulose fiber slurry can have a freeness level greater than about 250 mL CSF.

In some embodiments of this aspect of the disclosure, the cellulose fibers can comprise hardwood chemical pulp or a combination of hardwood and softwood chemical pulps.

In some embodiments the cellulose fiber slurry can comprise recycled cellulose fibers, mechanical cellulose fibers, non-wood cellulose fibers, or any combination thereof.

In some embodiments of this aspect of the disclosure, the cellulose fibers can comprise hardwood chemical pulp or a combination of hardwood and softwood chemical pulps and can further comprise recycled cellulose fibers, mechanical cellulose fibers, non-wood cellulose fibers, or any combination thereof.

In some embodiments of this aspect of the disclosure, the micro- and nanofibrillated cellulose can comprise at least one of microfibrillated cellulose, nanofibrillated cellulose, fibrillary fines, and fiber fragments.

In some embodiments of this aspect of the disclosure, the amount of the retention or drainage aid can be between about 0.005% to about 4% of the dry weight of the cellulose fibers.

In some embodiments of this aspect of the disclosure, the retention or drainage aid can be selected from the group consisting of a cationic or anionic acrylamide copolymer, a PEI copolymer, polyethylene oxide (PEO), and a cationic polymer combined with an anionic microparticle In some embodiments of this aspect of the disclosure, the anionic microparticle can be colloidal silica, bentonite, a micropolymer, or any combination thereof.

Another aspect of the disclosure encompasses embodiments of a method to manufacture a tissue paper, the method comprising the steps of: (a) obtaining a cellulose fiber slurry by combining a non-fibrillated or partially fibrillated cellulose fiber slurry with a fibrillated cellulose fiber slurry having a freeness level between about 50 mL CSF to about 390 mL CSF or a micro- and nanofibrillated cellulose; (b) adding a retention or drainage aid to the cellulose fiber slurry, thereby generating a cellulose fiber slurry having a freeness greater than about 250 mL CSF; and (c) manufacturing a tissue paper with a basis weight of from about 7 to about 80 grams per square meter.

In some embodiments of this aspect of the disclosure, in step (a) between about 40% to about 99.9% fiber dry weight of the cellulose fiber of the cellulose fiber slurry can be non-fibrillated or fibrillated to have a freeness level of at least 300 mL CSF.

In some embodiments of this aspect of the disclosure, in step (a) between about 1% to about 60% fiber dry weight of the cellulose fiber of the cellulose fiber slurry can be subjected to mechanical or chemical fibrillation to a freeness level between about 50 mL Canadian Standard Freeness (CSF) and about 390 mL CSF.

In some embodiments of this aspect of the disclosure, in step (a) between about 0.10% to about 30% fiber dry weight of the cellulose fiber of the cellulose fiber slurry can be converted to micro- and nanofibrillated cellulose.

In some embodiments of this aspect of the disclosure, the micro- and nanofibrillated cellulose comprises at least one of microfibrillated cellulose, nanofibrillated cellulose, fibrillary fines, and fiber fragments.

In some embodiments of this aspect of the disclosure, after the addition of the retention or drainage aid the cellulose fiber slurry can have a freeness level greater than about 250 mL CSF.

In some embodiments of this aspect of the disclosure, the cellulose fibers can comprise hardwood chemical pulp or a combination of hardwood and softwood chemical pulps.

In some embodiments the cellulose fiber slurry can comprise recycled cellulose fibers, mechanical cellulose fibers, non-wood cellulose fibers, or any combination thereof.

In some embodiments of this aspect of the disclosure, the cellulose fibers can comprise hardwood chemical pulp or a combination of hardwood and softwood chemical pulps and can further comprise recycled cellulose fibers, mechanical cellulose fibers, non-wood cellulose fibers, or any combination thereof.

In some embodiments of this aspect of the disclosure, the amount of the retention or drainage aid can be between about 0.005% to about 4% of the dry weight of the cellulose fibers of the tissue-making cellulose fiber slurry.

In some embodiments of this aspect of the disclosure, the retention or drainage aid can be selected from the group consisting of a cationic or anionic acrylamide copolymer, a PEI copolymer, polyethylene oxide (PEO), and a cationic polymer combined with an anionic microparticle.

In some embodiments of this aspect of the disclosure, the tissue paper manufactured in step (c) can have a basis weight of from about 7 to about 54.6 g/m$^2$; a caliper from about 126 μm to about 794 μm, wherein the caliper is measured by applying a static load of 2 kPa; a bulk from about 6.1 cm$^3$/g to about 17.2 cm$^3$/g; TSA Softness (TS7) from about 7.5 dB to about 20.3 dB; TSA Smoothness (TS750) from about 12.9 dB to about 75.3 dB; tensile strength (MD) from about 100 N/m to about 668 N/m; tensile strength (CD) from about 28 N/m to about 220 N/m; arithmetic average tensile strength from about 78 N/m to about 424 N/m.

Yet another aspect of the disclosure encompasses embodiments of a tissue paper manufactured by any method herein disclosed.

In some embodiments of this aspect of the disclosure, wherein the tissue paper can have a basis weight of from about 7 to about 54.6 g/m$^2$; a caliper from about 126 μm to about 794 μm, wherein the caliper is measured by applying a static load of 2 kPa; a bulk from about 6.1 cm$^3$/g to about 17.2 cm$^3$/g; TSA Softness (TS7) from about 7.5 dB to about 20.3 dB; TSA Smoothness (TS750) from about 12.9 dB to about 75.3 dB; tensile strength (MD) from about 100 N/m to about 668 N/m; tensile strength (CD) from about 28 N/m to about 220 N/m; arithmetic average tensile strength from about 78 N/m to about 424 N/m.

It should be emphasized that the embodiments of the present disclosure, particularly any "preferred" embodiments, are merely possible examples of the implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

The specific examples below are to be construed as merely illustrative, and not limitative of the remainder of the disclosure in any way whatsoever. Without further elaboration, it is believed that one skilled in the art can, based on the description herein, utilize the present disclosure to its fullest extent. All publications recited herein are hereby incorporated by reference in their entirety.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include ±1%, ±2%, ±3%, ±4%, ±5%, ±6%, ±7%, ±8%, ±9%, or ±10%, or more of the numerical value(s) being modified.

EXAMPLES

Example 1

Manufacture of tissue paper with reduced fiber content: A blend of virgin pulp fibers (market pulps) consisting of 70% by weight of Southern Bleached Hardwood Kraft (SBHK) and 30% by weight of Northern Bleached Softwood Kraft (NBSK) was used to prepare tissue-making slurries of different freeness levels. Freeness of the slurry was determined according to the Canadian standard method as described in TAPPI T 227 om-99 (TAPPI T 227 om-99. *Freeness of Pulp (Canadian Standard Method)* Atlanta, Ga. (1999), incorporated herein by reference in its entirety). The freeness of the tissue-making slurry was adjusted by mechanical fibrillation of the softwood fraction of the slurry. Tap water was used for dispersion of the fibers. The hardwood fraction was used as provided by the manufacturer.

For manufacture of a control tissue paper, the NBSK portion of the wood pulp mixture was refined to a freeness of 406 mL CSF. The fiber fraction was then mixed with the SBHK unrefined fiber fraction and prepared in a slurry form having a fiber dry weight content of 0.3% and a freeness value of 547 mL CSF. This control slurry was used to prepare uncreped control handsheets having a basis weight value of 30.6 g/m$^2$.

Figure 3:
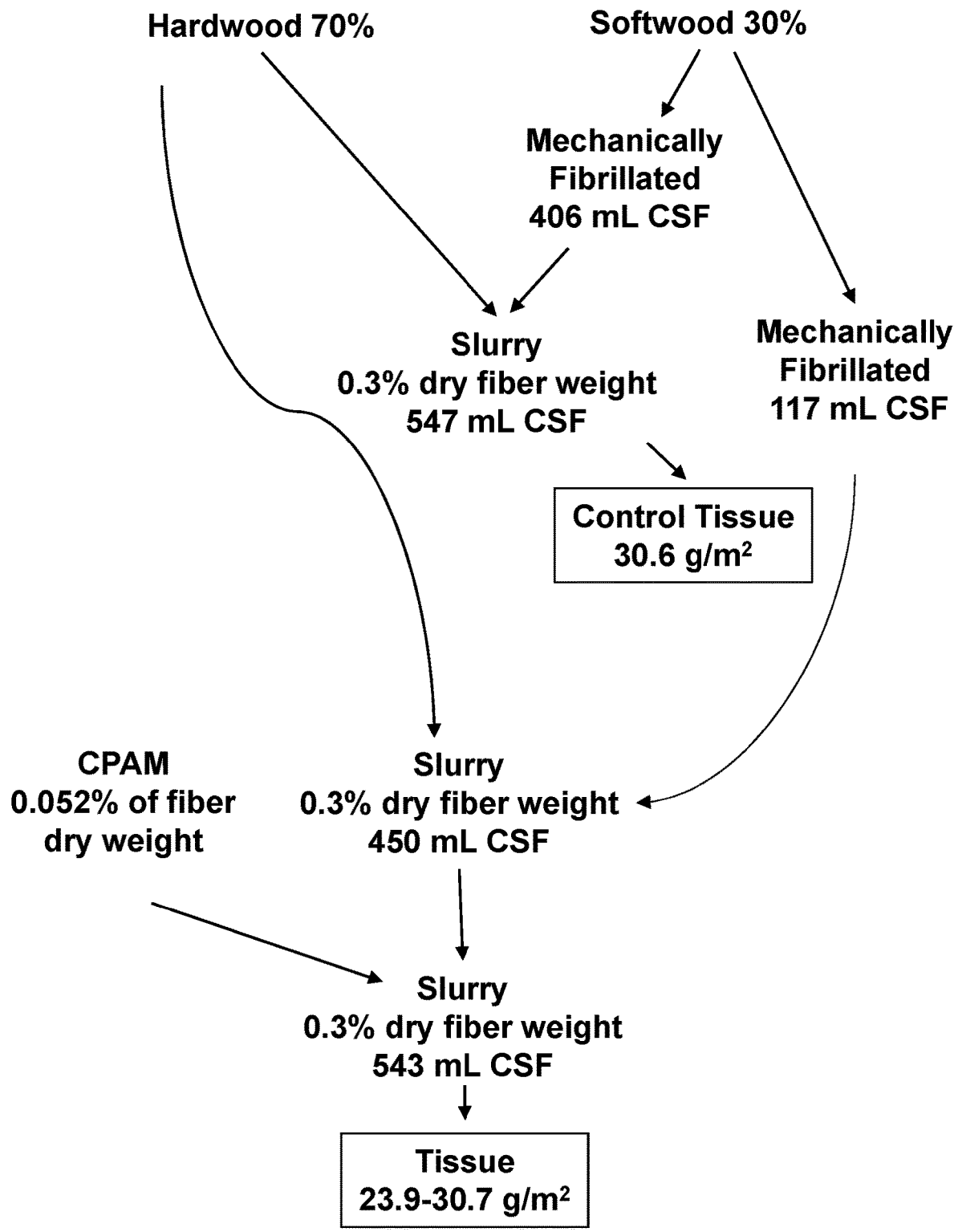
FIG. 3 schematically illustrates the experimental protocol of preparing an embodiment of the tissue paper according to the disclosure using an intensive mechanical fibrillation method.

For the generation of tissue papers according to the disclosure, as shown schematically in FIG. 3, the NBSK fraction of the wood pulp mixture was subjected to intensive mechanical fibrillation. The mechanical action was controlled to obtain a freeness value of about 117 mL CSF. This fibrillated fiber fraction was then mixed with the SBHK unrefined fiber fraction and prepared in a slurry form having a fiber dry weight content of 0.3% and a freeness value of 450 mL CSF. A CPAM dosage equivalent to 0.052% of the fiber dry weight was added to the slurry. The CPAM amount was adjusted so as to provide a slurry freeness value of 543 mL CSF. This slurry was used to prepare uncreped tissue handsheets with a lower fiber content compared to the control sheet, i.e., having a basis weight value between about 23.9 g/m$^2$ and about 30.7 g/m$^2$.

In addition, handsheets were prepared using the slurry comprising the NBSK fraction of the wood pulp mixture but without the addition of the CPAM to illustrate the effect of coupling the reduction in the fiber content via intensively mechanical fibrillation with a retention or drainage aid.

Example 2

Manufacture of tissue paper with reduced fiber content-conversion of cellulosic fiber mixture into MNFC: A blend of virgin pulp fibers (market pulps) consisting of 70% by weight of Southern Bleached Hardwood Kraft (SBHK) and 30% by weight of Northern Bleached Softwood Kraft (NBSK) was used to prepare a tissue-making slurry. The fibers were used as provided by the manufacturer and none of the fiber fractions were exposed to mechanical fibrillation. The only mechanical action applied to the slurry throughout the preparation procedure was that necessary to disperse the pulp fibers to form the slurry. A control tissue-making slurry had a fiber dry weight content of 0.3% and a freeness value of 627 mL CSF and was used to prepare uncreped handsheets having a basis weight value of 29.8 g/m$^2$.

Figure 4:
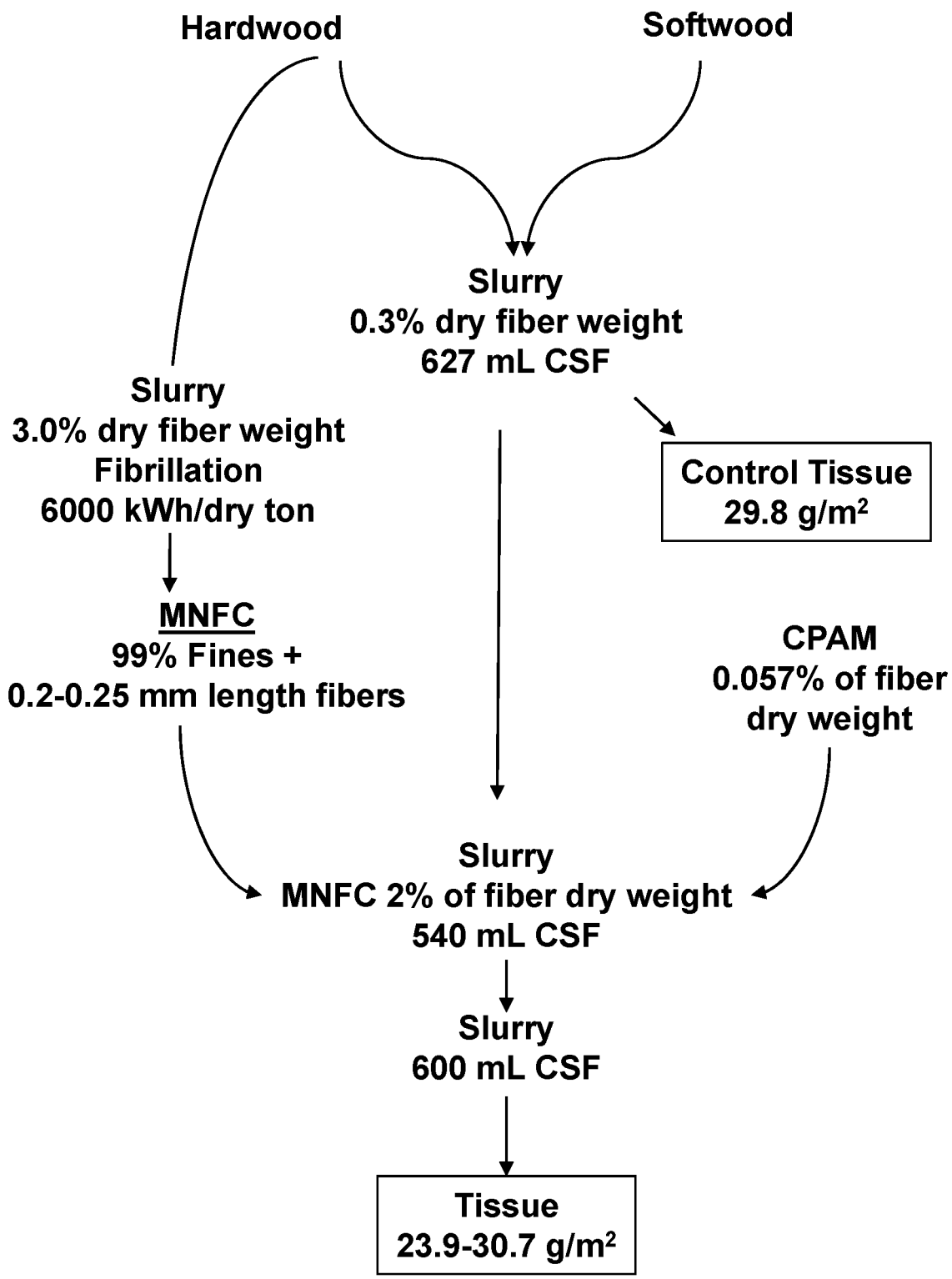
FIG. 4 schematically illustrates the experimental protocol of preparing an embodiment of the tissue paper according to the disclosure using a micro- and nanofibrillation method.

For the generation of tissue papers according to the disclosure, as shown schematically in FIG. 4, SBHK fibers were converted into MNFC. Mechanical fibrillation was carried out in an ultra-fine friction grinder SupermassColloider (model MKZA6-5, Masuko Sangyo, Co., Ltd, Saitama, Japan) with the fibers in a slurry form having a fiber dry weight content of 3%. The MNFC was produced using a net fibrillation energy input of 6,000 kWh per oven dry ton. About 99% of the treated cellulosic material was fine particles (on a length weighted basis), as determined by a Fiber Quality Analyzer (HiRes FQA, OPTest Equipment Inc., Hawkesbury, ON, Canada); the length of the remaining portion of treated fiber decreased from its initial fiber length to be between about 0.2 mm to about 0.25 mm in length.

The MNFC was added to the control slurry to a concentration of 2% of the dry weight of fiber in combination with a CPAM dosage of 0.057% based on dry weight of fibers. The CPAM amount was adjusted so as to provide a slurry freeness value of about 600 mL CSF.

This slurry was used to prepare uncreped handsheets with a lower fiber content than the control sheet, i.e., having a basis weight value of between about 23.9 g/m$^2$ and about 30.7 g/m$^2$. In addition, handsheets were prepared using the slurry comprising the MNFC but without the addition of the CPAM to illustrate the effect of coupling the reduction in the fiber content with a retention or drainage aid. The freeness of the slurry without the addition of CPAM resulted in 540 mL CSF.

Example 3

Modified handsheet-making procedure for tissue testing: In tissue manufacturing operations, wet pressing of the paper web is typically minimized to preserve bulk. This is because densification of the wet web results in poor softness and absorbency in the final tissue product. The procedures of the present disclosure, i.e., forming handsheets for physical tests of pulp, corresponded to a modified version of TAPPI T 205 sp-02 (TAPPI T 205 sp-02. *Forming Handsheets for Physical Tests of Pulp*. Atlanta, Ga.; (2006), incorporated herein by reference in its entirety). This alternative method adapted the standard procedure to match or mimic the conditions used in tissue manufacturing. Briefly, pressing and ring drying of the handsheets were avoided. Instead, after formation and couching, the handsheets were dried using a cylindrical dryer (Formax 12", Adirondack Machine Co., Gleans Fall, N.Y.) that simulated Yankee dryer operation. The cylindrical dryer was set to run at 110° C., 20% of nominal speed, and 5 min residence time. The handsheets produced from this adapted method were uncreped.

Example 4

Handsheet testing: Evaluation of the mechanical properties of handsheets prepared according to the methods of the disclosure was performed according to ISO 12625 that dictates the standard procedures for testing of tissue paper and tissue products. The handsheet samples were conditioned for 24 hours under a standard atmosphere set at 50% relative humidity and 23° C. before testing (ISO 187. *Paper, Board and Pulps-Standard Atmosphere for Conditioning and Testing and Procedure for Monitoring the Atmosphere and Conditioning of Samples*. Geneva, Switzerland (1990), incorporated herein by reference in its entirety). The values reported for basis weight and bulk were obtained from an average of 20 measurements performed on different handsheet samples. For other properties, the results reported were the average of a minimum of seven measurements.

(a) Basis weight: Basis weight (mass per unit area) was determined according to ISO 12625-6 (ISO 12625-6. *Tissue Paper and Tissue Products-Part 6: Determination of Grammage*. Geneva, Switzerland (2005), incorporated herein by reference in its entirety).

(b) Thickness and bulk: Thickness and bulk (inverse of apparent bulk density) were determined according to ISO 12625-3 (ISO 12625-3. *Tissue Paper and Tissue Products-Part 3: Determination of Thickness, Bulking Thickness and Apparent Bulk Density and Bulk*. Geneva, Switzerland (2005), incorporated herein by reference in its entirety). Thickness was measured by applying a static load of 2 kPa on the handsheet sample (digital micrometer, model 49-56, Buchel B.V., Veenendaal, Holland).

(c) Tensile strength: Tensile strength, defined as the maximum tensile force per unit width, was determined according to ISO 12625-4 (ISO 12625-4. *Tissue Paper and Tissue Products-Part 4: Determination of Tensile Strength, Stretch at Maximum Force and Tensile Energy Absorption*. Geneva, Switzerland (2005), incorporated herein by reference in its entirety). A handsheet sample of 50 mm in width and at least 150 mm in length was stretched to breakage at a constant rate of elongation of 50 mm/min using a tensile-testing apparatus that measured and recorded the tensile force as a function of the elongation (Instron®, model 4443, Canton, Mass.).

(d) Softness: Softness (human sensorial response obtained when a tissue product is stroked with the fingers and crumpled by the hand) (Hollmark & Ampulski (2004) *Nord. Pulp Pap. Res. J.* 19: 345-353), was assessed with a Tissue Softness Analyzer (Emtec Electronic GmbH, Leipzig, Germany). Assessment was based on the analysis of the sound spectrum generated by the combined vibration of the tissue sample and six vertical lamellas that rotate horizontally on the tissue surface causing friction.

Two characteristic peaks on the sound spectrum are relevant for the tissue softness evaluation, the TS7 or TSA softness centered at around 6500 HZ, and the TS750 or TSA smoothness found between 200 to 2000 Hz. TS7 results from the vibration of the vertical lamellas and is a function of several variables that include, but are not limited to, fiber stiffness, number of free fiber ends, fiber bonding strength, fiber network rigidity, micro compressibility of the creping waves, and chemical additives. A lower TS7 value is generally associated with a softer tissue (Wang et al., (2019) *BioResources* 14: 780-795). TS750 or TSA smoothness results from the vibration of the paper web itself, and correlates with the smoothness/roughness or texture of the tissue surface, which depend on parameters such as embossing and creping. A lower TS750 value typically relates to a smoother tissue surface. Accordingly, TS7 and TS750 were used as indicators of tissue softness and tissue smoothness respectively.

Example 5

Properties of Handsheets with Reduced Fiber Content
(a) Tensile strength and reduction in fiber content: The advantages derived from the reduction in the fiber content of tissue sheets using the manufacturing pathway of Example 1 (schematically shown in FIG. 3) is presented in FIG. 5A. When no CPAM is added to the slurry, intensive mechanical fibrillation of the NBSK portion to a freeness level 117 mL CSF, which is low compared with more typical freeness levels of above 450 mL CSF used in tissue-making operations, increased tensile strength by up to at least 15.4% with respect to the control sheet. This gain in tensile strength allowed for a fiber reduction in the tissue sheet by as much as about 10.8%. Such a reduction in fiber content did not compromise the strength properties of the sheet, which remained superior to, or at the same value as, than that of the control sheet.

Although positive results were obtained in terms of reducing the basis weight of the sheet, the freeness value of the slurry decreased by about 97 mL CSF units below that of the freeness value of the control slurry. This lower freeness of the slurry could be disadvantageous for allowing tissue machine performance at high speeds. The addition of CPAM to the slurry, however, helped address the issues related to the low freeness. Thus, the gain in tensile strength allowed reducing the fiber content by as much as about 12.1%, while the freeness values were maintained at those of the control slurry. Strength requirements were also met.

Figure 5A:
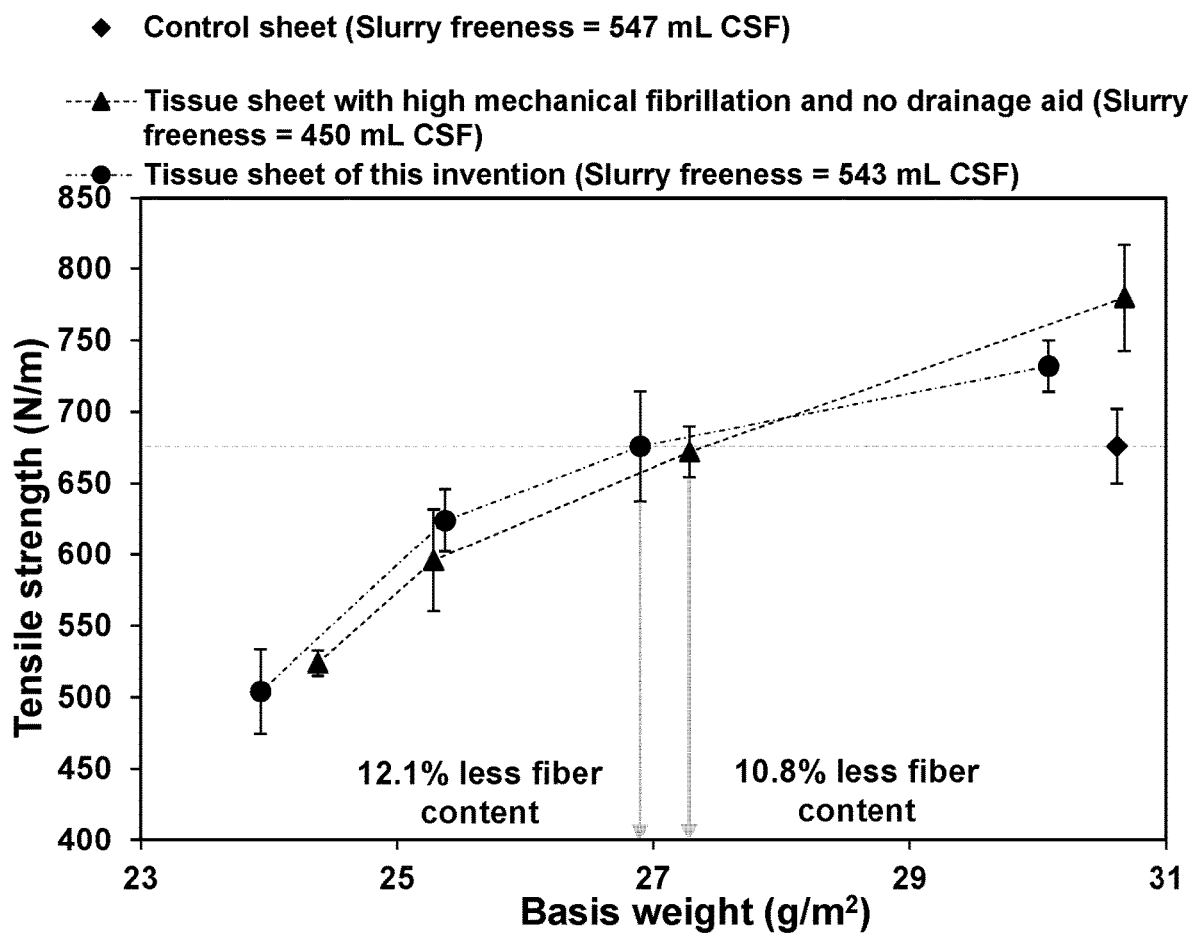
FIGS. 5A and 5B illustrate the effect of the reduction in the fiber content on the tensile strength of tissue paper generated using the methods of the disclosure.
Figure 5B:
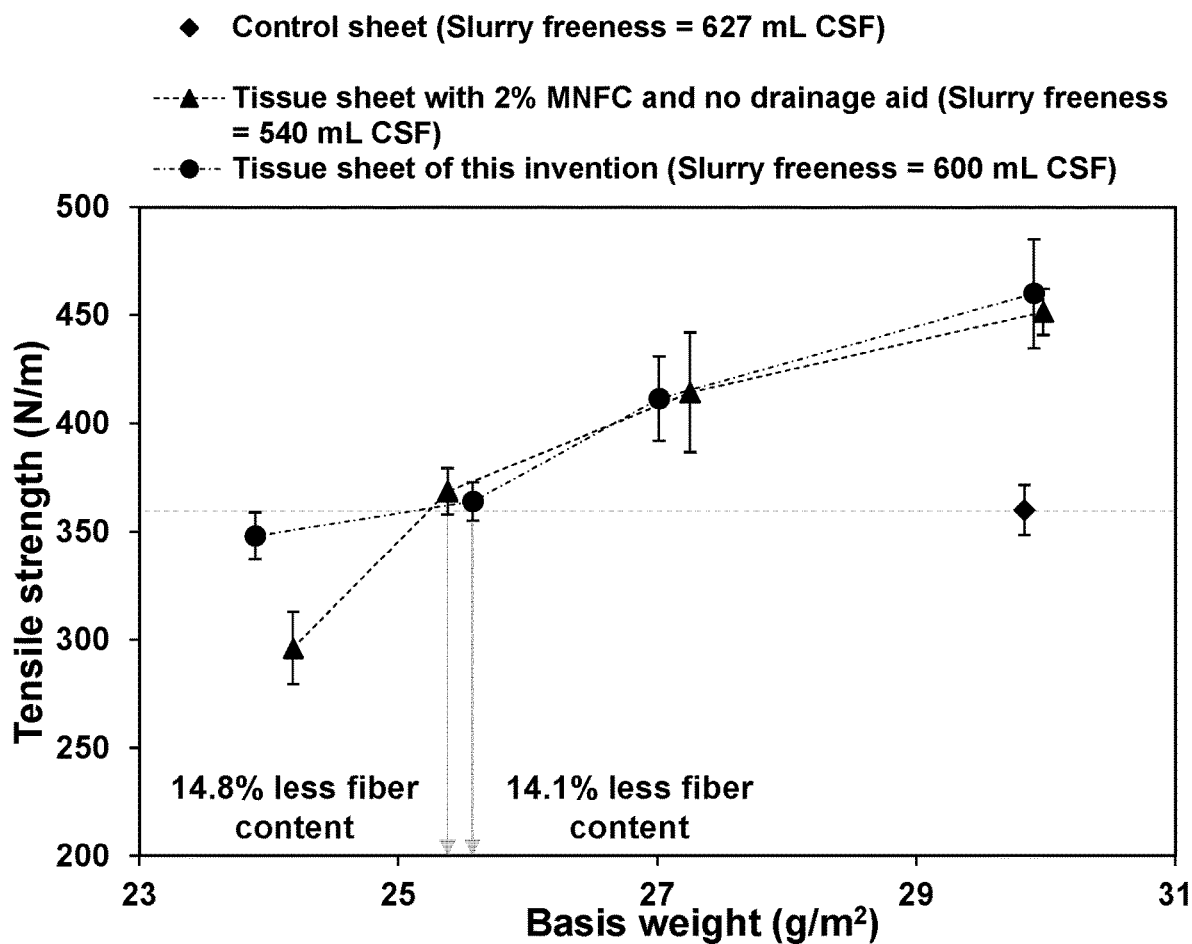

The advantages derived from the reduction in the fiber content of tissue sheets using the manufacturing pathway of Example 2 (schematically shown in FIG. 4) is presented in FIG. 5B. When no CPAM was added to the slurry, the addition of 2% MNFC increased the tensile strength by up to about 25% with respect to the control sheet. This gain in tensile strength allowed a fiber reduction in the tissue sheet of up to about 14.8%.

Such a reduction in the fiber content was achieved without compromising the strength properties of the sheet, which remained at least at the same value than in the control sheet. For instance, a sheet with 14.8% less fiber content had a similar tensile strength than the control sheet. However, the freeness value of the slurry containing 2% MNFC decreased by about 87 mL CSF units below that of the freeness value of the control slurry. When CPAM was added to the slurry, the freeness value increased to a level approximately the same as found in the control slurry ($\Delta$=27 mL CSF units). Advantageous results were obtained in terms of ability to reduce the fiber content. Handsheets made from this slurry had about 14.1% less fiber content with respect to the control at similar or higher strength values. CPAM dosage can be adjusted to match the exact freeness of the control slurry.

(b) Tissue softness: The reduction in the fiber content can adversely affect other desired properties of the sheet, especially the tissue softness. In that regard, the effect of the manufacturing pathways described in Examples 1 and 2 on tissue softness is shown in FIGS. 6A and 6B. The increase in tensile strength resulting from the intensive mechanical fibrillation of a portion of the cellulosic fiber mixture or the addition of MNFC yielded a tissue sheet with poor softness (the TS7 values were high compared to the control sheets). This reduction in softness was partially counteracted with the reduction in the fiber content of the sheets that in general diminished the TS7 values. However, such an effect was not sufficient to attain the softness of the control sheet, specifically at the basis weight where the tensile strength of the latter can be achieved.

The addition of CPAM coupled with the fiber reduction improved the softness of the tissue paper. With this combination, reduced fiber content tissue sheets with a softness that was similar to that of the control sheet were obtained. For instance, after CPAM was added to the slurry generated by the method of Example 1, the softness losses were mitigated. At the basis weight where the tensile strength value of the control sheet was achieved, the TS7 of the tissue sheet with a reduction in fiber content of 12.1% was 8.2% lower compared to the control sheet (FIG. 6A). Similarly, after CPAM was added to the slurry generated by the method of Example 2, a reduction of 14.1% in the fiber content was obtained at a basis weight where the tensile strength of the control sheet was achieved, while the TS7 value was within 2.3% of that of the control sheet (FIG. 6B).

(c) Tissue bulk: A reduction in the fiber content should preferably not result in adverse effects on the tissue bulk. The effects of the manufacturing pathways described in Examples 1 and 2 on tissue bulk are shown in FIGS. 5A and 5B, respectively. The intensive mechanical fibrillation of a portion of the cellulosic fiber mixture as described in the method of Example 1 before the addition of CPAM reduced the bulk of the tissue sheet to values below that of the control sheet (FIG. 7A). This negative effect on bulk was partially counteracted by the reduction in the fiber content, which generated an increase in the bulk of the sheets. At the basis weight where the desired tensile strength of the control sheet is achieved, the tissue bulk was 0.7% below that of the control sheet. The subsequent addition of CPAM to the refined fiber slurry, however, dampened the reduction in bulk observed in first place. A tissue sheet with slightly greater bulk than the control sheet (+3.2%) was obtained at the basis weight where the tensile strength of the control sheet was achieved (but with 12.1% less fiber content).

Similarly, the addition of MNFC to the fiber slurry as described in the method of Example 2 produced tissue sheets with bulk values that were about 5.9% below that of the control sheet; when the MNFC was combined with CPAM, the tissue bulk was maintained at values that were slightly above that of the control sheet within the range of basis weights evaluated (FIG. 7B). In particular, at the basis weight where the tensile strength of the control sheet was achieved, the bulk of the sheet having a fiber content of about 14.1% less than the control value was within 1% of that of the control sheet Even though the tissue sheets with reduced fiber content were equal to or bulkier than the control sheet, there was always a reduction in the tissue thickness when compared to the control. In all instances, such a reduction in thickness was a consequence inherent to the removal of fibers from the sheet and was proportional to the percent reduction in the fiber content. The resulting thinner tissue sheets can be advantageous for the manufacture of more compacted tissue rolls with a greater number of sheets per roll while having a performance similar to that of rolls produced from thicker sheets.

Example 6

TABLE 1

Properties of tissue paper with reduced fiber content manufactured according to the method of Example 1

| Condition | Basis weight (g/m$^2$) | Tensile strength (N/m) | TSA Softness TS7[1] (dB) | Bulk (cm$^3$/g) | Caliper (μm) | Freeness of slurry (mL CSF) |
|---|---|---|---|---|---|---|
| Control sheet | 30.6 | 676 | 43.9 | 4.39 | 134 | 547 |
| Tissue sheet-high mechanical fibrillation, no drainage aid | 27.3 | 672 | 50.9 | 4.36 | 119 | 450 |
| Tissue sheet of Example 1 | 26.9 | 676 | 40.3 | 4.53 | 122 | 543 |

[1]A lower TS7 value is generally associated with a softer tissue sheet

Example 7

TABLE 2

Properties of tissue paper with reduced fiber content manufactured according to Example 2

| Condition | Basis weight (g/m$^2$) | Tensile strength (N/m) | TSA Softness TS7[1] (dB) | Bulk (cm$^3$/g) | Caliper (μm) | Freeness of slurry (mL CSF) |
|---|---|---|---|---|---|---|
| Control sheet | 29.8 | 360 | 29.8 | 4.84 | 144 | 627 |
| Tissue sheet-2% MNFC, no drainage aid | 25.4 | 369 | 35.1 | 4.52 | 115 | 540 |
| Tissue sheet of Example 2 | 25.6 | 364 | 30.5 | 4.89 | 125 | 600 |

[1]A lower TS7 value is generally associated with a softer tissue sheet

Example 8

Creping of handsheets: The response of handsheets with reduced fiber content to the creping action was evaluated to confirm that the positive results and performance that were obtained for uncreped handsheets were maintained after the creping process. More specifically, it was intended by means of this example to understand how the changes related to the paper web (e.g., basis weight, bulk and caliper) and tissue-making process (e.g., intensive mechanical refining, addition of drainage aids, and formation) proposed by the disclosure may affect the effectiveness of the creping process in developing the tissue properties.

The creping of the handsheets was performed using a creping simulator similar to one used by Hämäläinen et al., (Hämäläinen et al., (2016) Nord. Pulp Pap. Res. J. 31: 448-458). The creping simulator was composed of two sections, namely (i) the spraying/sheet transfer section, and (ii) the drying/creping section; and four main elements, namely (i) a sled to move the sheet throughout the different sections, (ii) a spray system to spray the creping chemistry on the sled, (iii) a transfer roll covered with a forming fabric to transfer the wet sheet to the sled, and (iv) a creping blade to perform the creping action on the sheet.

Speeds of 1.4 m/s and 2.5 m/s were set at the spraying/sheet transfer section, and the drying/creping section respectively. The moisture in the forming fabric was adjusted to between about 15% to about 18% to ensure good adhesion between the fabric and the wet sheet before transferring of the sheet to the sled. Polyaminoamide-epichlorohydrin (PAE) adhesive was used as the main constituent of the creping chemistry. No other chemicals, e.g., release agent and modifier, were added. The creping chemistry on the sled surface was adjusted to about 2.4 mg/m$^2$ based on dry solids of PAE. The surface of the sled was electrically heated to 115° C. The temperature was sufficient to dry the wet sheet to about 95% consistency before encountering the creping blade. A creping angle of 80° controlled by the bevel angle was used.

The creping simulator did not have a forming section and a reel. Uncreped handsheets were directly loaded onto the forming fabric for each creping run at a consistency of between about 40% to about 45% (based on weight of the wet sheet). For each of the testing conditions, a portion of the handsheets was left uncreped for evaluating the evolution of the tissue properties before and after the creping operation. All the handsheets were conditioned as described in Example 4 before testing. Once conditioned, the creped sheets were stretched using the tensile-testing apparatus described in Example 4.

The handsheets subjected to the creping operation were produced by the procedures described in Example 1 with omission of the drying step. A wood fiber mixture comprising 80% by weight unrefined BEK and 20% by weight mechanically fibrillated NBSK was used for preparation of the handsheets. For the control sheets, the NBSK wood fiber fraction (with a starting freeness of 722 mL CSF) was mechanically fibrillated to a freeness level of 606 mL CSF and then mixed with the unrefined BEK wood fiber fraction. The control slurry had a freeness value of 597 mL CSF. For the sheets with reduced fiber content, the fraction of NBSK fibers was intensively fibrillated to a freeness value of 406 mL CSF and then mixed with the unrefined BEK wood fiber fraction. A CPAM dosage of 0.03% based on dry weight of fibers was added to the tissue-making slurry in order to adjust the freeness to a level of 588 mL CSF (approximately the same freeness of the control slurry).

Example 9

Properties of Sheets with Reduced Fiber Content Before and After Creping and Comparison with Control Sheet:

TABLE 3

Properties of tissue paper with reduced fiber content before creping

| Condition | Basis weight (g/m$^2$) | Tensile strength (N/m) | Caliper (μm) | Bulk (cm$^3$/g) | TSA Softness TS7[1] (dB) | TSA Smoothness TS750[2] (dB) |
|---|---|---|---|---|---|---|
| Uncreped control sheet | 30.2 | 365 | 137 | 4.5 | 27 | 38 |
| Uncreped tissue sheet of Example 8 | 26.0 | 352 | 121 | 4.6 | 25 | 33 |

[1]A lower TS7 value is generally associated with a softer tissue sheet
[2]A lower TS750 value is generally associated with a smoother tissue sheet

TABLE 4

Properties of tissue paper with reduced fiber content after creping

| Condition | Basis weight (g/m²) | Tensile strength (N/m) | Caliper (μm) | Bulk (cm³/g) | TSA Softness TS7[1] (dB) | TSA Smoothness TS750[2] (dB) | Crepe ratio (%) |
|---|---|---|---|---|---|---|---|
| Creped control sheet | 35.4 | 122 | 281 | 7.9 | 10 | 44 | 14.8 |
| Creped tissue sheet of Example 8 | 30.4 | 124 | 234 | 7.7 | 10 | 31 | 14.2 |

[1]A lower TS7 value is generally associated with a softer tissue sheet
[2]A lower TS750 value is generally associated with a smoother tissue sheet (a) Tensile strength and reduction in fiber content: An uncreped tissue sheet with basis weight of 30.2 g/m² and tensile strength of 365 N/m was used as the control sheet for the creping operation. The tissue sheet with reduced fiber content subjected to creping had a basis weight of 26.0 g/m² and a tensile strength of 352 N/m (13.9% less fiber content and approximately similar tensile strength than the control sheet).

After creping, both sheets were stretched resulting in crepe ratios of 14.8% and 14.2% for the control sheet and the sheet with reduced fiber content respectively. An increase in the basis weight was obtained as a result of the formation of crepe folds and respective reduction in the length of the sheet. The basis weight of the control sheet increased by 17.2% (from 30.2 g/m² to 35.4 g/m²), whereas the basis weight of the sheet with reduced fiber content increased by 16.9% (from 26.0 g/m² to 30.4 g/m²). The percent of fiber reduction at the creped state remained comparable to that of the uncreped state (14.1% less fiber content in the sheet of the present disclosure). The sheets experienced a reduction in the tensile strength that was also similar (67% and 65% for the control sheet and the sheet with reduced fiber content, respectively), so that, as with the uncreped state, both sheets maintained comparable tensile strength values after creping. The tensile strength losses resulted from the partial failure of the paper web due to the compression forces exerted by the creping blade, which disrupts and breaks internal fiber-fiber H-bonds in the sheet. The reduction in tensile strength obtained in this Example was similar to the values for dry-crepe of commercial tissue products and tissue handsheets creped with the same creping simulator used in this study (Pan et al., (2019) *Int. J. Solids Structures* 165: 23-33; De Assis (2019) *Ph.D. thesis*, Depart. Forest Biomaterials, North Carolina State U).

(b) Tissue caliper and bulk: Before undergoing creping, the sheet with reduced fiber content had a caliper 11.7% lower than the control sheet. Although strength requirements are satisfied, the reduction in fiber content commonly results in a tissue sheet with reduced thickness.

The creping action increased the caliper of the sheets. Such an increase in caliper was more prominent for the control sheet (+105%) than for the sheet with reduced fiber content (+93%). This caused a further 5% deviation in the initial difference in caliper observed before creping. Creping is known to cause continuous buckling and delamination of the paper web, as a result of compressing forces acting on the sheet as it is scraped off from the dryer surface by a creping blade. The creped sheet, which initially has a flat structure, expands in the Z-direction and acquires a wavy structure with crepe folds whose amplitude and wavelength depend on the intensity of the creping force.

Creping computer modeling indicates that the caliper of the uncreped paper web compared to other variables such as web density, Young's modulus, fracture energy, creping velocity and creping angle, has one of the greatest impacts on the creping force, and the amplitude and wavelength of the crepe folds. According to creping simulations, a higher sheet caliper (or stiffness of the web while keeping Young's modulus constant) typically results in higher creping wavelength and creping amplitude (Pan et al., (2018) *J. Manufacturing Sci. Engineering* 140: 071003; Ramasubramanian et al., (2011) J. *Manufacturing Sci. Engineering* 133: 051011). Larger wavelengths and amplitude of the crepe folds results in tissue paper with higher caliper. The higher crepe ratio obtained for the control sheet might also magnify the difference in caliper observed after creping, as a higher crepe ratio is typically associated with a higher amplitude and smaller wavelength of the crepe folds.

Before creping, the bulk of the sheets had a 2.2% difference. Buckling and expansion of the sheet in the Z direction caused by the creping pressure resulted in an increase in the bulk (+76% and +67% for the control sheet and the sheet with reduced fiber content respectively). Similarly, as observed with the caliper, the creping action caused greater changes on the control sheet than on the sheet with reduced fiber content. Even though both sheets displayed bulk values that were close after the creping process (2.5% difference), the sheet with reduced fiber content was thinner (16.7% lower caliper than the control sheet).

(c) Tissue softness and smoothness: The tissue softness and smoothness assessment was performed on the surface of the sheet that was in direct contact with the sled. The sled was a flat cast iron surface simulating the surface of the Yankee dryer.

Before the creping process, the sheet with reduced fiber content showed a TS7 value 7.4% lower than the control sheet. This was consistent with the results obtained in Example 5, where the reduction in the fiber content coupled with the addition of CPAM allowed obtaining a tissue sheet with similar tensile strength than the control sheet and similar to improved softness. The creping operation caused a reduction in the TS7 (−63% and −60% for the control sheet and the sheet with reduced fiber content respectively), which resulted in a similar value. The same TS7 value displayed at the creped state indicated a great similarity in terms of softness of both sheets.

The TS750 of the sheet with reduced fiber content was 13.2% lower compared to the control sheet before creping, which along with the lower TS7 values, translated into a sheet with similar softness and greater smoothness. The creping action had different effects on the TS750, contrary to what was observed with the TS7, which decreased for both sheets. After creping, the TS750 of the control sheet increased by 15.7%. The increase in TS750 was associated with a coarser crepe structure (crepe folds of high amplitude and wavelength), which resulted in poor smoothness. This was in agreement with the significant increase in bulk observed for the control sheet. On the other hand, the sheet with reduced fiber content experienced little to no change in the TS750 after creping. The creping action developed a finer crepe structure (crepe folds of small amplitude and wavelength), which resulted in better smoothness. This also correlated with the less prominent increase in caliper obtained for this sheet. As a result, creping further increased to 29.5% the differences observed in the TS750 at the uncreped state.

Example 10

TABLE 5

Numeric value ranges of properties of commercial tissue papers retained in the tissue papers manufactured by the methods of the disclosure despite a lowering in basis weight of about 1% to about 30%.

| Property | Unit | Min | Max |
|---|---|---|---|
| Basis weight | g/m$^2$ | 7 | 54.6 |
| Caliper[1] | μm | 126 | 794 |
| Bulk | cm$^3$/g | 6.1 | 17.2 |
| TSA Softness - TS7 | dB | 7.5 | 20.3 |
| TSA Smoothness - TS750 | dB | 12.9 | 75.3 |
| Tensile strength - MD | N/m | 100 | 668 |
| Tensile strength - CD | N/m | 28 | 220 |
| Arithmetic average tensile strength | N/m | 78 | 424 |
| Tissue-making slurry freeness | mL CSF | 250 | 700 |

[1]caliper measured using a static load of 2 kPa

What is claimed:

1. A cellulose fiber slurry for use in the manufacture of a tissue paper, the cellulose fiber slurry comprising cellulose fibers that have been subjected to mechanical or chemical fibrillation of between about 1% to about 60% fiber dry weight of the cellulose fiber to a freeness level between about 50 mL Canadian Standard Freeness (CSF) and about 390 mL CSF; and a retention or drainage aid, wherein the cellulose fiber slurry has a freeness level greater than about 250 mL CSF.

2. The cellulose fiber slurry of claim 1, wherein the cellulose fibers comprise hardwood chemical pulp or a combination of hardwood and softwood chemical pulps.

3. The cellulose fiber slurry of claim 2, wherein the cellulose fiber slurry further comprises recycled cellulose fibers, mechanical cellulose fibers, non-wood cellulose fibers, or any combination thereof.

4. The cellulose fiber slurry of claim 1, wherein the cellulose fiber slurry comprises recycled cellulose fibers, mechanical cellulose fibers, non-wood cellulose fibers, or any combination thereof.

5. The cellulose fiber slurry of claim 1, wherein the amount of the retention or drainage aid is between about 0.005% to about 4% of the dry weight of the cellulose fibers.

6. The cellulose fiber slurry of claim 1, wherein the retention or drainage aid is selected from the group consisting of a cationic or anionic acrylamide copolymer, a PEI copolymer, polyethylene oxide (PEO), and a cationic polymer combined with an anionic microparticle.

7. The cellulose fiber slurry of claim 6, wherein the anionic microparticle is colloidal silica, bentonite, a micropolymer, or any combination thereof.

* * * * *